UNITED STATES PATENT OFFICE 2,491,741

DOUBLE CAMPHORATE OF HYOSCYAMINE AND MORPHINE

Jules H. T. Ledrut, Saint-Gilles, Belgium

No Drawing. Application August 7, 1947, Serial No. 767,329. In Belgium June 17, 1947

1 Claim. (Cl. 260—285)

The present invention relates to a double camphorate of hyoscyamine and morphine.

The preparation of acid and neutral camphorates such as the camphorates of lithium, magnesium, calcium and ammonium is known. Likewise various organic camphorates have already been prepared such as those of hexamethylene-tetramine, amino alcohols, alkaloids, etc.

The present invention relates to the preparation of camphorates of the general formula

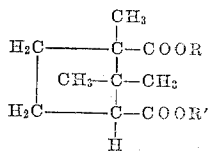

The camphorates of the type above specified may be obtained according to the present invention, by starting from camphoric acid and by causing two basic compounds to act in succession on this compound so as to obtain the compound the formula of which is indicated above in which R and R' are different, one of the basic compounds above mentioned being of odd valency.

The same camphorates may also be obtained according to the present invention by starting from an acid camphorate, on which a basic compound is caused to react so as to obtain the compound above indicated, in which R and R' are different.

According to one mode of carrying out the invention in order to obtain a double camphorate starting from camphoric acid, the two basic compounds which react with the camphoric acid are alkaloids.

According to another mode of carrying out the invention in order to obtain a double camphorate starting from an acid camphorate of an alkaloid, the basic compound which is caused to act with the acid camphorate mentioned above is another alkaloid.

The invention relates likewise to double camphorates, such as the double camphorates of metals of which one at least is of odd valency, double camphorates of a metal and of an organic base and double camphorates of organic bases and in particular those of alkaloids.

The invention will now be described in detail, reference being made to the following examples. The appended claim is directed to the product according to Example 9, namely, the double camphorate of hyoscyamine and morphine. This compound finds use as a therapeutic, more particularly because of its parasympathicolytic properties.

Example 1

200 parts by weight of camphoric acid are dissolved in 600 cm.³ of water, 36.95 parts of lithium carbonate are then added. The reaction mixture is heated at boiling point until the evolution of $CO_2$ ceases. Acid camphorate of lithium is thus obtained.

17 parts of ammonia are then added to the aqueous solution of the acid lithium camphorate. When the reaction is complete the double camphorate of lithium and ammonium is crystallised in an ice-box.

The crystals obtained are dried.

Example 2

400 parts by weight of camphoric acid in aqueous solution are mixed with 270 parts of ferric chloride. By heating to boiling point a red precipitate is formed. After decantation the precipitate is washed with boiling water and brought back into suspension in water. 42.16 parts of magnesium carbonate are then added to the aqueous solution containing the ferric camphorate. The mixture is heated until the evolution of $CO_2$ ceases and the red precipitate of the double camphorate of iron and magnesium is dried.

Example 3

Acid camphorate of lithium is prepared by the method described by E. Jungfleisch and Ph. Landrieu in the "Annales de Chimie" (9), 2, 54 (1914). According to these authors the acid camphorate of lithium is obtained by starting from a solution containing 5% of camphoric acid and 44.5% of neutral camphorate of lithium. The crystals of acid lithium camphorate obtained are collected by filtration by a vacuum pump, then dried, first on a porous plate and then between sheets of blotting paper.

5.15 gr. (1/40 of a mol.) of acid lithium camphorate are dissolved in 10 cm.³ of hot ethyl alcohol. To this alcoholic solution are added 3.57 gr. (1/40 of a mol.) of hexamethylene-tetramine. The mixture is heated for some minutes on a water bath and stirred meanwhile. By cooling in an ice-box crystals of the double camphorate of lithium and hexamethylene-tetramine are formed which are separated and dried in vacuo.

The yield of the reaction amounts to 58% of the theoretical yield.

Example 4

Acid camphorate of hexamethylene-tetramine is prepared by the process described in German Patent No. 270,180 by causing equimolecular proportions of hexamethylene-tetramine to react with camphoric acid in an inert solvent.

340 parts of acid hexamethylene-tetramine camphorate are dissolved in 900 cm.³ of water. 37 parts of lithium carbonate are then added and the mixture is heated until the evolution of $CO_2$ ceases. By cooling in an ice-box crystals of the double camphorate of lithium and hexamethylene-tetramine are formed which are separated and dried in vacuo.

The yield amounts to 33% of the theoretical yield.

Example 5

200 parts by weight of camphoric acid are mixed with 37 parts of lithium carbonate. 200 parts of water are added and the mixture is heated until the evolution of $CO_2$ ceases. When the reaction is complete, 37 parts of hexamethylene-tetramine are added and the mixture is boiled for some minutes. Crystals of the double camphorate of lithium and hexamethylene-tetramine are obtained by cooling and separated and dried in vacuo.

The yield is 72%.

Instead of lithium carbonate lithium hydroxide may be used.

Example 6

Acid hexamethylene-tetramine camphorate is prepared according to the process described in German Patent No. 270,180.

340 parts by weight of acid hexamethylene-tetramine camphorate are dissolved in 300 parts of alcohol and to this mixture are added 172 parts of p-amino-phenyl-sulphamide. After heating under a reflux condenser for two hours and cooling in an ice-box crystals of the double camphorate of hexamethylene-tetramine and p-amino-phenyl-sulphamide are obtained which are separated and dried as indicated in the preceding examples.

Example 7

200 parts of camphoric acid and 87 parts of morpholine are dissolved in aqueous alcohol. 41.16 parts of carbonate of magnesium are added and the mixture is heated to boiling point until solution is complete. The product is placed in an ice-box and the crystals of the double camphorate of magnesium and morpholine obtained are centrifuged.

Example 8

On the one hand 200 parts of camphoric acid are dissolved in a mixture of chloroform and ethyl alcohol.

On the other hand 285 parts of morphine are dissolved in ether.

The two solutions are added to each other and then heated until solution is complete. 289 parts of atropine are added and the mixture heated under a reflux condenser. The solvents are driven off and an oil is obtained which precipitates on the addition of ethyl alcohol. By recrystallisation from alcohol crystals of double camphorate of atropine and morphine are obtained.

Example 9

200 parts of camphoric acid are dissolved in a mixture of ethyl alcohol and chloroform (750 parts) and 303 parts of hyoscyamine are added. The whole is heated until solution is complete and then 285 parts of morphine are added. After elimination of the solvent, the product is recrystallised from alcohol. Crystals of the double camphorate of hyoscyamine and morphine are obtained.

Example 10

To 200 parts of camphoric acid dissolved in 1000 parts of alcohol are added 212 parts of caffeine ($C_8H_{10}O_2N_4+H_2O$). When the caffeine has been completely dissolved by heating in the alcoholic solution of camphoric acid, 324 parts of quinine dissolved in alcohol are added. The reaction mixture is heated until reaction is complete. The solvent is driven off in vacuo and the double camphorate of quinine and caffeine obtained purified by recrystallisation from alcohol.

Example 11

200 parts of camphoric acid and 162 parts of ephedrine basis are dissolved in 260 parts of hot alcohol. 231 parts of pyramidon are then added. When the reaction which produces the camphorate of ephedrine and pyramidon is complete, the solvent is driven off. An oil is obtained, which crystallises on the addition of petroleum ether. The crystals obtained are filtered off and recrystallised from alcohol.

It is obvious that the invention is not exclusively limited to the modes of preparation described in the preceding examples. In the like manner, other camphorates than those above mentioned may be prepared by these processes.

What I claim is:

As a new product, the double camphorate of hyoscyamine and morphine.

JULES H. T. LEDRUT.

REFERENCES CITED

The following references are of record in the file of this patent:

UNITED STATES PATENTS

| Number | Name | Date |
| --- | --- | --- |
| 1,064,227 | Kircher | June 10, 1913 |
| 1,458,992 | Scheele | June 19, 1923 |
| 1,672,000 | Schoeller et al. | June 5, 1928 |
| 1,717,585 | Schoeller et al. | June 18, 1929 |
| 2,058,081 | Johannessohn et al. | Oct. 20, 1936 |
| 2,081,547 | Matthews | May 25, 1937 |
| 2,211,630 | Stuart | Aug. 13, 1940 |
| 2,223,937 | Ebert | Dec. 3, 1940 |
| 2,328,000 | Finkelstein | Aug. 31, 1943 |
| 2,376,313 | Reiff | May 15, 1945 |
| 2,406,892 | Niederl | Sept. 3, 1946 |

FOREIGN PATENTS

| Number | Country | Date |
| --- | --- | --- |
| 8,640 | Great Britain | A. D. 1902 |

OTHER REFERENCES

Hilditch, J. Chem. Soc. (Transactions), vol. 99, p. 228 (1911).

Chem. Abst., vol. 9, p. 1806 (1915).

Chem. Abst., vol. 27, p. 1453 (1933).

Jungfleisch et al., "Annales de Chemie," series 9, vol. 2, pp. 10, 29, 43 and 52.